(12) United States Patent  
Schneider et al.

(10) Patent No.: US 6,938,858 B1  
(45) Date of Patent: Sep. 6, 2005

(54) SPACECRAFT WINDOW ASSEMBLY

(75) Inventors: William C. Schneider, Houston, TX (US); Edwin E. Lardizabal, Las Vegas, NV (US)

(73) Assignee: Bigelow Aerospace, North Las Vegas, NV (US)

( * ) Notice: Subject to any disclaimer, the term of this patent is extended or adjusted under 35 U.S.C. 154(b) by 0 days.

(21) Appl. No.: 10/875,709

(22) Filed: Jun. 24, 2004

(51) Int. Cl.[7] ................................. B64G 1/22
(52) U.S. Cl. ............... 244/158 R; 244/159; 244/129.3; 52/2.11
(58) Field of Search ..... 244/158 R, 159; 52/2.11–2.26

(56) References Cited

U.S. PATENT DOCUMENTS

| | | | | |
|---|---|---|---|---|
| 4,825,599 A | * | 5/1989 | Swann, Jr. | .................... 52/2.15 |
| 6,231,010 B1 | | 5/2001 | Schneider et al. | |
| 6,547,189 B1 | | 4/2003 | Raboin et al. | |

OTHER PUBLICATIONS

Case Study, "Design and Analysis of the Transhab Window Frame" 1999.*
ISS Inflatable HAB Overview 21 Pages Dec. 1998.*
Bigelow Aerospace to Tackle Inflatable Space Habitats by Leonard David, May 2004.*
http://eol.jas.nasa.gov/worf/win2.gif.

* cited by examiner

*Primary Examiner*—Galen Barefoot
(74) *Attorney, Agent, or Firm*—Franklin E. Gibbs

(57) ABSTRACT

A spacecraft window assembly for providing external viewing from inside an inflatable module is claimed. The inflatable shell has a plurality of layers and each layer has a window opening. The spacecraft window assembly comprises a body, a window assembly window opening, and at least one pressure pane disposed within, and forming a substantially airtight seal with, the window assembly.

The body of the window assembly is adapted for securedly receiving each one of the plurality of layers of the inflatable shell to the body of the window assembly such that the window opening in each layer of the inflatable shell is substantially aligned with the pressure pane.

Further, the body of the window assembly is adapted to form a substantially air tight seal with at least one layer of the inflatable shell.

7 Claims, 3 Drawing Sheets

SPACECRAFT WINDOW ASSEMBLY

BACKGROUND OF THE INVENTION

1. Field of the Invention

This invention relates to a window assembly for use in a space environment to support an inflatable human habitat module or other inflatable space structure.

2. Description of the Prior Art

Windows have been an integral part of manned spacecraft since the inception of space flight. A window serves many purposes such as allowing the inhabitants of a spacecraft to avoid a closed-in or claustrophobic feeling and assisting extra-vehicular activities by observing events outside the craft.

The usual application of a window has traditionally been in conjunction with a solid, or hard, shelled space vehicle. In this use, a window frame is attached to a rigid structural wall of a craft. This is roughly similar to the use of a window in a conventional aircraft. There are, however, major differences between a rigid hulled space vehicle and an inflatable module.

A typical inflatable module has an air barrier, a restraint layer, and an orbital debris shield. Each layer is designed to address a particular issue that is encountered in a space environment. The debris shield affords a level of protection against hypervelocity impactors penetrating the hull and causing a loss of the module's air into space. The air bladder provides the primary impervious barrier to prevent gas flow and the restraint layer provides structural support against the loads induced by the pressure.

Modules having these basic characteristics are identified in U.S. Pat. No. 6,231,010 to Schneider, et al and U.S. Pat. No. 6,547,189 to Raboin, et al. Each of these patents briefly alludes to, but does not claim or provide a detailed structure for, a window as part of an inflatable module.

One of the key advantages to an inflatable module is that the module can be folded into a confined space prior to launch, thereby making it easier to fit within a launch vehicle payload, and then inflated to a significantly larger volume upon deployment into space.

Consequently, each of the layers of an inflatable module must be flexible to allow for folding and unfolding of the shell. As each layer serves a different function, the characteristics and materials in each layer will be different. This requires the window assembly to accommodate each layer in a different way. For example, the window assembly would be seal bonded in an airtight fashion to the air barrier and provide attachment points for the straps in the restraint layer in a different fashion.

This is an atypical approach that is distinct from the type of window assembly that would be used in a solid shelled space vehicle. In a rigid hulled structure, the window assembly would not move in relation to the hull. Furthermore, an inflexible hull would usually not have a plurality of layers where each layer would require a different attachment means.

In the case of an inflatable module, the window assembly, while not flexible, must not damage the flexible shell when the shell is folded or unfolded. Also, the assembly must interact with the layers of the hull to provide a sufficient airtight integrity to substantially sustain the atmosphere within the module when the spacecraft is deployed.

Another aspect of a window assembly is that it must not become opaque due to fogging. This is where the water in the air condenses on the surface of the window due to a difference in temperature across the viewable window surface between the internal module environment and that of space. To lessen this problem, the window assembly has a channel between viewable layers to equalize pressure and reduce fogging.

SUMMARY OF THE INVENTION

A spacecraft window assembly for use with the inflatable shell of an inflatable modular structure is claimed. The inflatable shell has a plurality of layers and each layer has a window opening.

The spacecraft window assembly comprises a body, a window assembly window opening, and at least one pressure pane disposed within, and forming a substantially airtight seal with, the window assembly. The pressure pane is substantially aligned with the window assembly window opening.

The body of the window assembly is adapted for securely receiving each one of the plurality of layers of the inflatable shell to the body of the window assembly such that the window opening in each layer of the inflatable shell is substantially aligned with the pressure pane.

Further, the body of the window assembly is adapted to form a substantially air tight seal with at least one layer of the inflatable shell.

DETAILED DESCRIPTION OF THE DRAWINGS

The present invention may best be understood by reference to the following description taken in conjunction with the accompanying drawings.

Figure 1:
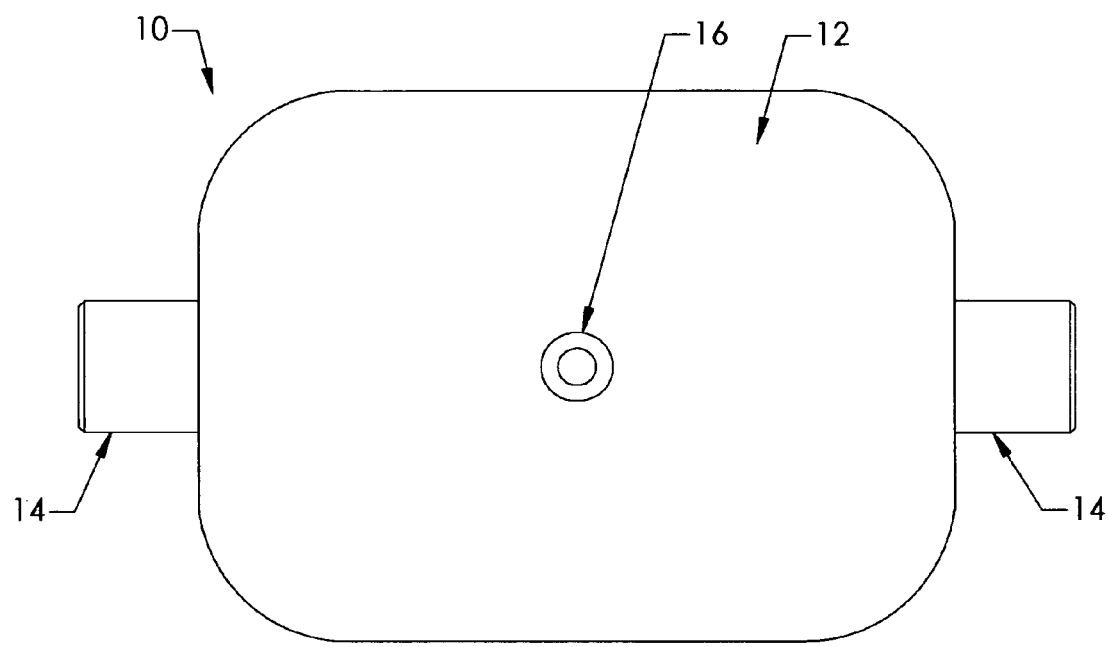
FIG. 1 is a side view of an inflatable modular structure.

FIG. 1 is a side view of an inflatable modular structure 10. The structure 10 has a flexible shell 12 and two solid end caps 14. Also present is a window 16. The window 16 allows occupants of the module 10 to view outside the structure. This is a typical embodiment of an inflatable module, but the present invention is not limited to the exact geometrical structure of FIG. 1.

Figure 2:
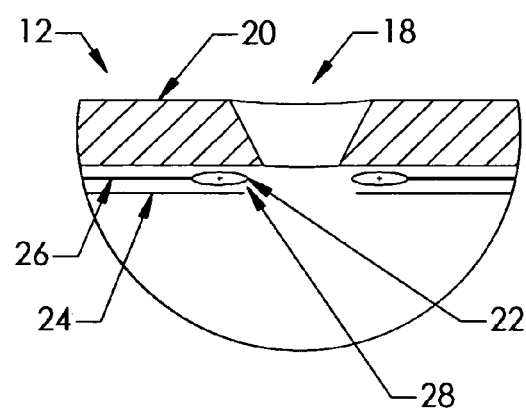
FIG. 2 is partial cut-away view of the inflatable shell.

FIG. 2 is a partial cross-sectional view of the inflatable shell and details a window opening 18 extending through the flexible shell 12. The shell 12 has three layers. There is a debris shield 20, a restraint layer 22 and an air bladder 24. In application, the debris shield can have multiple layers in a fashion similar to a Whipple Shield. Each layer is flexible, to some degree.

The restraint layer 22 is composed of a number of straps 26. The main purpose of the restraint layer is to transfer the load from the less structural air barrier to the straps. In the area of the window opening 18 the straps have loops 28. These loops 28 are used to secure the straps 26 to a window assembly.

Figure 3:
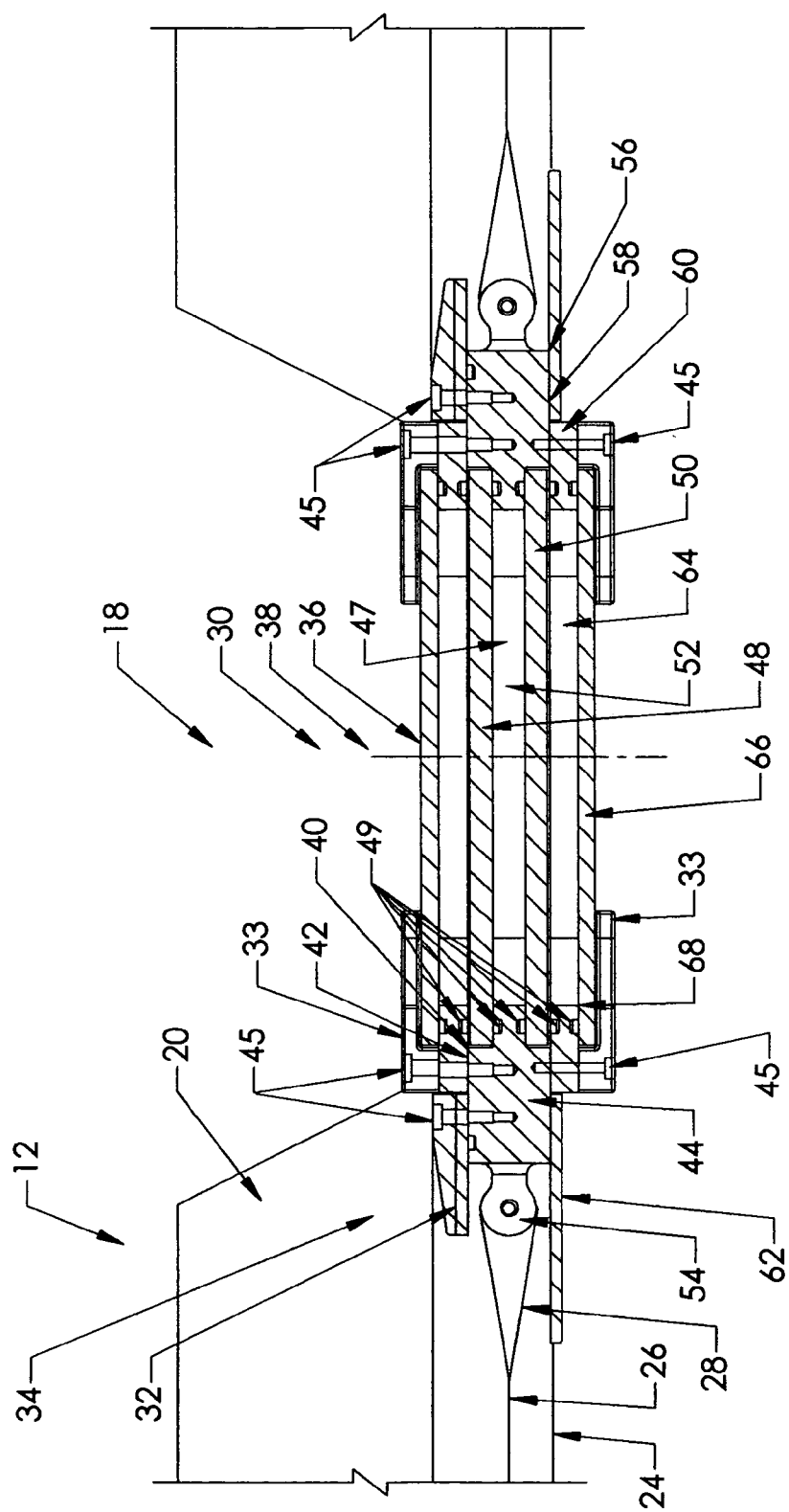
FIG. 3 is a partial cut-away side view of the window assembly.

Turning to FIG. 3, a partial cross section of the window assembly 30 is depicted and connected to the three layers of the shell 12.

The external attachment plate 32, or top section, has a top surface 34 that attaches to the debris shield 20. The attachment can be accomplished by know means including, but not limited to, the use of an epoxy based adhesive. A first sacrificial pane 36 is fixed to the plate 32 by way of a securing plate 33 that is secured in place with screws 45. The plate has a bottom surface 40 that is fixed to the top surface 42 of the strap attachment plate 44. The strap attachment plate 44 is also referred to as the middle section. The top and middle sections are secure to one-another by a variety of means. The figure identifies the preferred embodiment of using a number of screws 45.

The strap attachment plate 44 has a window opening 47. A first pressure pane 48 fits into the strap attachment plate 47 and the pane 48 is secured to the middle section 44. In one embodiment, the pane 48 is secured to the middle section 44 as to form a substantially air tight seal between the pane 48 and the plate 44. In such an embodiment, the seal between the pane 48 and the plate 44 is substantially airtight by using known methods such as o-ring seals and gaskets 49.

A second pressure pane 50 fits into the strap attachment plate 44 and the pane 50 is also attached to the middle section 44 and is secured in an airtight manner similar to the way the first pane 48 is secured to the middle section 44 above. The panes 48 and 50 are disposed relative to one another such that there is a volume 52 that exists between them.

The strap attachment plate 44 has a number of loop attachment elements 54 around the periphery of the plate 44. Each of the elements 54 is adapted to receive a loop 28 that is part of the strap 26. The restraint layer 22 generally takes the load from the air barrier 24. This load is then distributed through the window assembly 30 by way of the loop attachment elements 54. The straps 26 transfer the loads resulting from the pressure to the loop attachment elements 54. The loads are then transferred through the strap attachment plate of the window assembly. The panes do not contribute to the transfer of loads from the straps.

The middle section 44 has a bottom surface 56 that is attached to the top surface 58 of the air barrier plate 60. The two surfaces 56 and 58 are secure together in a substantially airtight manner. In the preferred embodiment, this is accomplished through know methods including the use of screws 45, o-ring seals and gaskets 49.

There is a window opening 64 within the air barrier plate 60. A second sacrificial pane 66 is secured to the plate 60 by the se of a securing plate 33 that is attached to the plate 60 by known means. In the preferred embodiment, screws 45 are used to attach the securing plate 33 to the air barrier plate 60.

The plate 60 has a bottom surface 68. The air barrier 24 fits between the top surface 62 of the air barrier plate 60 and the bottom surface 56 of the middle section 44. A substantially airtight seal between the barrier 24 and the two surfaces 62 and 56 is achieved in the preferred embodiment by the use of a sealant. A variety of sealants that can provide that characteristic are known in the art. The plate 60 is secured to the middle section 44 by known methods. In the preferred embodiment, screws 45 are used.

The combination of the air barrier plate 60, the strap attachment plate 44, and the external attachment plate 32, secured together, form the body of the window assembly. In one embodiment, the body has only one pressure pane and no sacrificial panes. The body forms a substantially airtight seal with at least one sacrificial pane and the air barrier.

In another embodiment, a channel is used to connect the outer environment to the space 52. This allows for equalizing the pressure between the panes and thereby reduce fogging on the pane. A valve can be used in conjunction with the channel to regulate airflow should the second pressure pane 50 cease to be substantially airtight.

The sacrificial panes 36 and 66, and the pressure panes 48 and 50, provide a viewing window to the outside of the module. To perform this task, the panes substantially align with the various window openings within the sections.

Figure 4:
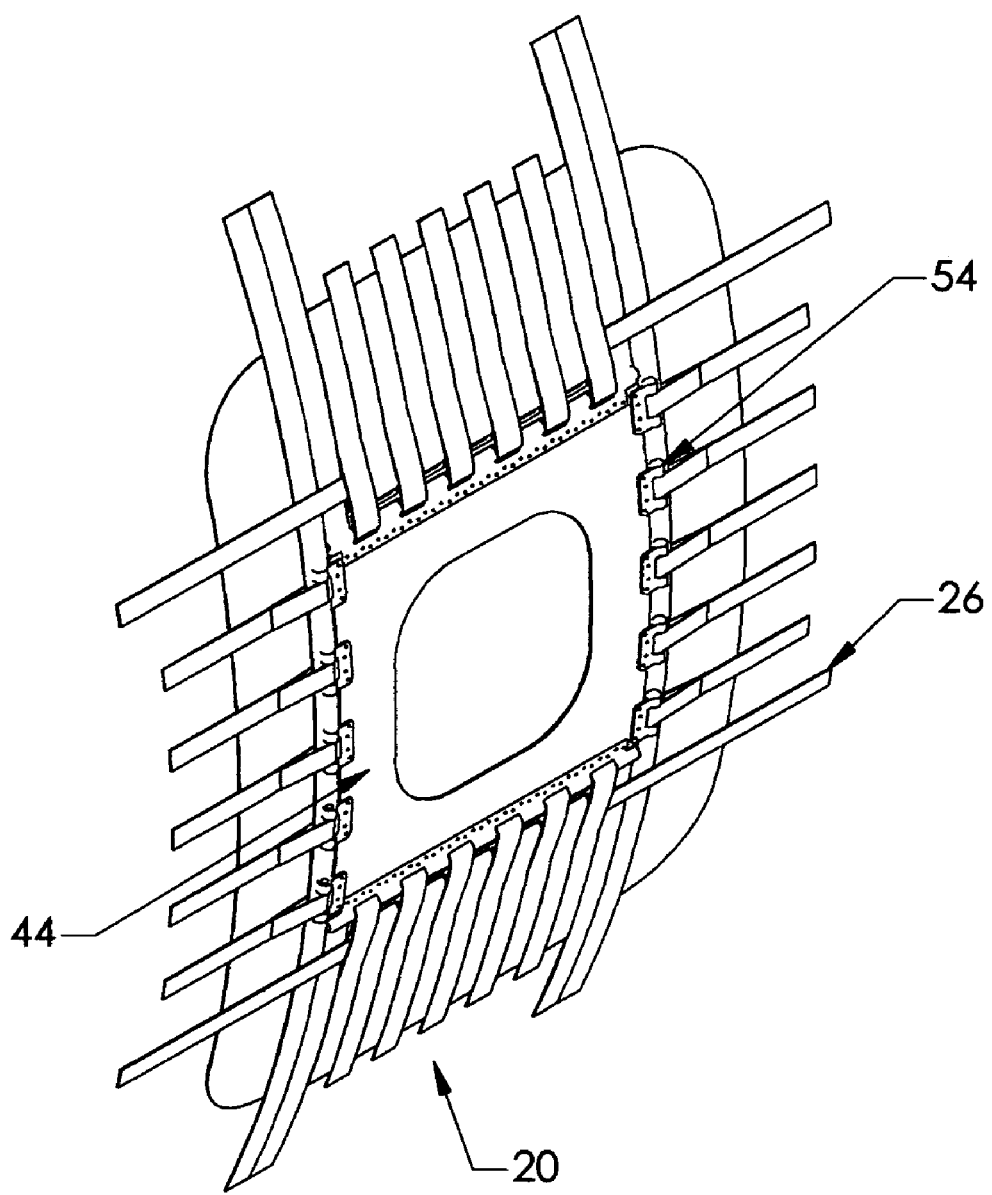
FIG. 4 is an isometric view of the window assembly interfacing with a number of straps.

Turning to FIG. 4, a plurality of straps 26 are shown attached to the loop attachment elements 54 around the periphery of the strap attachment plate 44.

A novel window assembly for use in an inflatable modular structure has thus been described. It is important to note that many configurations can be constructed from the ideas presented. Thus, nothing in the specification should be construed to limit the scope of the claims.

What is claimed is:

1. A spacecraft window assembly for use with an inflatable shell of an inflatable modular structure, the inflatable shell having a debris shield having a window opening, a restraint layer having an opening to receive the window assembly, and an air barrier having a window opening, the openings being substantially in alignment with one another, the spacecraft window assembly comprising:

a top section, a middle section, and a bottom section, and a window opening in each section, and one pressure pane being secured to the middle section, and forming a substantially airtight seal with, the middle section;

the top section being adapted to securely receive the debris shield such that the debris shield window opening is substantially in alignment with the pressure pane;

the middle section disposed within the opening of the restraint layer and being adapted to fixedly receive the restraint layer such that the window assembly is substantially aligned with the opening of the restraint layer; and the air barrier being secured between the bottom section and the middle section of the window assembly in a substantially airtight manner.

2. A spacecraft window assembly for use with an inflatable shell of an inflatable modular structure, the inflatable shell having a debris shield having a window opening, a restraint layer having a plurality of straps wherein a number of straps have at least one looped end adjacent to an opening to receive the window assembly, and an air barrier having a window opening, the spacecraft window assembly comprising:

a top section, a middle section, and a bottom section, and a window opening in each section, and the top section being securedly attached to the middle section, the middle section being securedly attached to, and forming a substantially airtight seal with, the bottom section, and a plurality of pressure panes disposed within the middle section and substantially aligned with the window opening of the middle section, and the pressure panes securedly affixed to the middle section and forming a substantially airtight seal with the middle section, and the window opening in each section being substantially in alignment with one another;

the top section being adapted to securely receive the debris shield such that the debris shield window opening is substantially in alignment with the pressure panes;

the middle section being adapted to receive the looped ends of the straps such that the window assembly is substantially aligned with the opening of the restraint layer; and the air barrier being secured between the bottom section and middle section in a substantially airtight manner.

3. A spacecraft window assembly for use with an inflatable shell of an inflatable modular structure having an internal volume, the inflatable shell having a debris shield having a window opening, a restraint layer having a plurality of straps wherein a number of straps have at least one looped end adjacent to an opening to receive the window assembly, and an air barrier having a window opening, the spacecraft window assembly comprising:

an external attachment plate having a top and a bottom surface, a window opening, and a first sacrificial pane fixedly disposed on the external attachment plate, and the top of the external attachment plate being adapted to fixedly receive the debris shield such that the window opening in the debris shield is substantially aligned with the window opening in the external attachment plate;

a strap attachment plate having a top and bottom surface, an outer periphery having a plurality of loop attachment elements adapted to receive a plurality of strap loops, a window opening, and a first pressure pane and a second pressure pane disposed on the strap attachment plate such that a volume exists between the pressure panes, and the panes being fixedly attached to, and forming a substantially air tight seal with, the strap attachment plate;

the strap attachment plate disposed within the window opening of the restraint layer and the loop attachment elements being adapted to receive the strap loops;

an air barrier plate having a top surface;

the air barrier securely disposed between the air barrier plate and the strap attachment plate in a substantially airtight manner;

the top surface of the air barrier plate being fixedly attached to the bottom surface of the strap attachment plate such that the window opening of the air barrier plate substantially aligns with the window opening of the strap attachment plate, and the top surface of the air barrier plate and bottom surface of the strap attachment plate forming a substantially air tight seal;

the top surface of the strap attachment plate being fixedly attached to the bottom surface of the external attachment plate such that the window opening of the external attachment plate is substantially aligned with the pressure panes; and a channel leading from the volume between the pressure panels to the internal volume of the inflatable modular structure.

4. A method for installing a spacecraft window assembly into an inflatable modular structure having a air barrier, a restraint layer including a plurality of straps and each of said strap having at least one loop, and a debris shield, and each layer having a window opening, and the window assembly having at least one pressure pane sealingly attached in an airtight fashion within the window assembly, the method comprising:

securing the debris shield to the window assembly such that the window opening in the debris shield is substantially aligned with the window opening of the window assembly;

securing a plurality of the loops of the straps of the restraint layer to the window assembly such that the window opening in the restraint layer is substantially aligned with the window opening of the window assembly; and securing the air barrier to the window assembly such that air barrier and the window assembly form a substantially airtight seal and the window opening in the air barrier is substantially aligned with the window opening of the window assembly.

5. A method for installing a window assembly into an inflatable modular structure as in claim 4 wherein the window assembly is the window assembly of claim 1.

6. A method for installing a window assembly into an inflatable modular structure as in claim 4 wherein the window assembly is the window assembly of claim 2.

7. A method for installing a window assembly into an inflatable modular structure as in claim 4 wherein the window assembly is the window assembly of claim 3.

* * * * *